US008898321B2

(12) United States Patent
Edelstein et al.

(10) Patent No.: US 8,898,321 B2
(45) Date of Patent: Nov. 25, 2014

(54) REMOTE DEVICE COMMUNICATION PLATFORM USER INTERFACE

(75) Inventors: Noah Benjamin Edelstein, Medina, WA (US); Carl Carter-Schwendler, Redmond, WA (US); Todd Ryun Manion, Seattle, WA (US); Ryan Yonghee Kim, Sammamish, WA (US); Jeson Patel, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1057 days.

(21) Appl. No.: 11/971,421

(22) Filed: Jan. 9, 2008

(65) Prior Publication Data

US 2009/0177791 A1 Jul. 9, 2009

(51) Int. Cl.
G06F 15/16 (2006.01)
G06F 3/0481 (2013.01)
H04L 29/08 (2006.01)
H04L 29/06 (2006.01)

(52) U.S. Cl.
CPC ............... *H04L 67/025* (2013.01); *H04L 67/08* (2013.01); *H04L 63/166* (2013.01); *H04L 63/0272* (2013.01); *H04L 63/104* (2013.01); *G06F 3/0481* (2013.01); *H04L 63/083* (2013.01); *H04L 67/02* (2013.01)
USPC ............................. 709/229; 715/851; 700/245

(58) Field of Classification Search
CPC ....... H04L 67/02; H04L 67/08; H04L 63/083; H04L 63/0272; H04L 63/104; H04L 63/166; H04L 67/025; G06F 3/0481; G06F 11/30; G06F 17/30873
USPC .................. 715/740, 751, 753, 851; 713/201; 709/205, 229; 700/245
See application file for complete search history.

(56) References Cited

U.S. PATENT DOCUMENTS 5,107,443 A * 4/1992 Smith et al. ................... 715/751
5,923,737 A * 7/1999 Weishut et al. ............ 379/93.17
6,144,991 A * 11/2000 England ........................ 709/205

(Continued)

OTHER PUBLICATIONS

Eckel, Erik; "How do I . . . Configure and use Logmein Pro remote access software"; Oct. 8, 2007; TechRepublic; pp. 1-15; retrieved at http://blogs.techrepublic.com.com/howdoi/?p=147 on Jun. 14, 2010.*

(Continued)

*Primary Examiner* — Anthony Mejia
*Assistant Examiner* — Schquita Goodwin
(74) *Attorney, Agent, or Firm* — Bryan Webster; Peter Taylor; Micky Minhas (57) ABSTRACT

Enabling a user interface (UI) for management of a host device from a client device. A connection is established between the host device and the client device via a web portal. The host device and the client device are without a host management software installed thereon. A content window is displayed on the client device in response to the established connection with the host device. A client status display area is displayed on the client device indicating at least a connection status with the host device. A corresponding host status display area is displayed on the host device indicating a connection status with the client device. The displayed client status display area specifically identifies the client device and defines client parameters for receiving messages during management of the host device. The displayed host status display area specifically identifies the host device and defines host parameters for receiving messages during interaction with the client device.

12 Claims, 8 Drawing Sheets

(56) References Cited

U.S. PATENT DOCUMENTS

| | | | |
|---|---|---|---|
| 6,222,538 B1* | 4/2001 | Anderson | 715/709 |
| 6,389,464 B1 | 5/2002 | Krishnamurthy et al. | |
| 6,437,803 B1 | 8/2002 | Panasyuk et al. | |
| 6,686,838 B1 | 2/2004 | Rezvani et al. | |
| 6,947,063 B1* | 9/2005 | Cirulli et al. | 715/851 |
| 6,973,482 B2 | 12/2005 | Mohammed et al. | |
| 6,999,912 B2 | 2/2006 | Loisey et al. | |
| 7,111,060 B2 | 9/2006 | Araujo et al. | |
| 7,187,997 B2* | 3/2007 | Johnson | 700/245 |
| 7,434,166 B2* | 10/2008 | Acharya et al. | 715/740 |
| 7,606,603 B2* | 10/2009 | Brubacher-Cressman et al. | 455/574 |
| 8,341,277 B2* | 12/2012 | Choudhury | 709/229 |
| 2002/0058497 A1* | 5/2002 | Jeong | 455/410 |
| 2004/0003073 A1 | 1/2004 | Krzyzanowski et al. | |
| 2004/0145605 A1 | 7/2004 | Basu et al. | |
| 2004/0250130 A1* | 12/2004 | Billharz et al. | 713/201 |
| 2006/0039356 A1 | 2/2006 | Rao et al. | |
| 2006/0048153 A1 | 3/2006 | Truong | |
| 2006/0142878 A1 | 6/2006 | Banik et al. | |
| 2006/0179118 A1 | 8/2006 | Stirbu | |
| 2006/0218285 A1 | 9/2006 | Talwar et al. | |
| 2006/0230105 A1 | 10/2006 | Shappir et al. | |
| 2007/0174410 A1 | 7/2007 | Croft et al. | |
| 2007/0192491 A1 | 8/2007 | Saigo et al. | |
| 2007/0198656 A1 | 8/2007 | Mazzaferri et al. | |
| 2008/0186162 A1* | 8/2008 | Rajan et al. | 340/539.13 |
| 2009/0024948 A1* | 1/2009 | Anka | 715/771 |

OTHER PUBLICATIONS

Monckton, Paul; "LogMeIn Pro"; Nov. 13, 2007; ZDNet UK; pp. 1-11; retrieved at http://www.zdnet.co.uk/reviews/communication-and-collaboration/2007/11/13/logmein-pro-39290730/ on Jun. 17, 2010.*

RemotelyAnywhere; "Logmein RemotelyAnywhere User Guide"; Apr. 2007; pp. 1-118.*

Fitzperich, Amanda; "How to make your pc available for remote desktop connection"; Oct. 2006; e-articles.info; pp. 1-6; retrieved from http://e-articles.info/e/a/title/How-to-make-your-PC-Available-for-Remote-Desktop-Connection on Dec. 4, 2010.*

Microsoft01; "How a Remote Desktop Connection Affects Windows XP Profesionall"; Jan. 25, 2006; Microsoft knowledgebase; pp. 1-3; retrieved from http://support.microsoft.com/default.aspx?scid=kb;en-us;280828 on Dec. 4, 2010.*

Microsoft02; "Troubleshooting General Remote Desktop Error Messages"; Jan. 21, 2005; Microsoft Technet; pp. 1-7; retrieved from http://technet.microsoft.com/en-us/library/cc780927(WS.10,printer).aspx on Dec. 4, 2010.*

Microsoft03; "Remote Desktop-without logging current user off?"; Jun. 2005; www.tomshardware.com; pp. 1-3.*

Richard Awusi, "An Evaluation of Windows Vista," Rhodes University, Section 4.4 User Account Control, pp. 36-37.*

Unknown, "EMCO Remote Desktop Professional," available at http://www.emco.is/remotedesktoppro/features.html, printed on Oct. 22, 2007, 2 pages.

Unknown, "Apple Remote Desktop 3: Technology Overview," available at http://images.apple.com/remotedesktop/pdf/ARD31_TO.pdf, Nov. 2006, 35 pages.

Unknown, "Remote Desktop Control," available at http:www/remote-desktop-control.com/, 2007, 3 pages.

Unknown, "AdminMagic—Remote Desktop Control Utility 2.1," available at http://www.redsofts.com/soft/553/4284/AdminMagic_Remote_Desktop_Control_Utility.html, 2006, 2 pages.

Unknown, "Shaw Remote Desktop Assistance," available at http://www.shaw.ca/en-ca/CustomerCare/InternetSupport/RDA.htm, 2007, 2 pages.

Unknown, "Remote Desktop Assistance—DameWare Mini Remote Control," available at http://www.unisa.edu.au/ists/devolvedITsupport/TechnicalResources/RemoteControl/DameWare.asp, printed on Oct. 19, 2007, 4 pages.

Unknown, "SlashSupport," available at http://www.slashsupport.com/ESMS/remote-desktop-management.html, 2007, 2 pages.

Unknown, "Apple Remote Desktop Administrator's Guide," Version 2.2, available at http://images.apple.com/server/docs/Apple_Remote_Desktop_Admin_Guide.pdf, 2005, 116 pages.

* cited by examiner

FIG. 6

REMOTE DEVICE COMMUNICATION PLATFORM USER INTERFACE

CROSS REFERENCE TO RELATED APPLICATION

This application is related to a U.S. patent application Ser. No. 11/971,417 entitled "REMOTE DEVICE COMMUNICATION PLATFORM" filed Jan. 9, 2008, which is incorporated herein by reference in its entirety.

BACKGROUND

Personal computing devices are transforming how individuals live their lives in the 21$^{st}$ century. Personal computers, laptop computers, personal digital assistants (PDA), cellular phones or other devices continue to assist individuals from extensive experiences in electronic document creations, electronic media communications, multimedia enjoyments, or the like. Furthermore, software programs installed on these devices further expand the scope of functionalities in these devices. In addition, users constantly store digital information and data on these devices for quick access and retrieval.

As users store information on the devices, it becomes important for users to be able to remotely access different devices. For example, a user who is working from home at a home computer may wish to access a work computer in his or her office. Currently, various technologies are available that use the Internet to connect these two computers. Typically, these systems would require that both the host computer (e.g., home computer) and the client computer (e.g., work computer) install a proprietary software program. Once the software is installed, the user needs to ensure that the client device is turned on and is connected to the Internet. The user next is situated at the host device and executes the installed software to establish a connection between the host device and the client device. This connection enables the user to access and retrieve information from the client device while the user is physically present at a location of the host device.

While these existing technologies facilitate the users to enable a remote access of a remote device, these technologies continue to require that a connection software is required to install on either the host device or the client device, or both before such direct connection is possible. Furthermore, because of the reliance on the installed software, a new user interface (UI) is needed to properly identify and/or distinguish the client device from the host device.

SUMMARY

Embodiments of the invention overcome the shortcomings of the existing technologies by providing a user interface (UI) to properly identify a host device and a client device in a remote device management session. The host device and the client device are being connected via a web portal without the need for a remote management software or program for facilitating the connection. Aspects of the invention further display a status display area to the client device and the host device and provide independent client parameters and host parameters, respectively, to further enable independent features on the client device and the host device.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Embodiments of the invention enable a convenient and stream-lined user interface (UI) or graphical UI (GUI) for remote management of a host (e.g., remote) device from a client (e.g., source) device. Aspects of the invention provide proper identifications of various control or operational elements during management of the client device and the host device. Referring first to FIGS. 1 to 4, diagrams illustrate exemplary embodiments of a user interface (UI) display shown on a client device and a host device during the connection between the two devices according to an embodiment of the invention. In one embodiment, the UI displays described herein may also be displayed on the client device and the host device via a client application on the client device or a host application installed on the host device. The client application or the host application are not remote management applications. For example, the client application or the host application may be an internet browser application capable of connecting to the Internet. Other applications capable of connecting to the Internet and render content from devices connected to the Internet may be used without departing from the scope or spirit of aspects of the invention.

Figure 1:
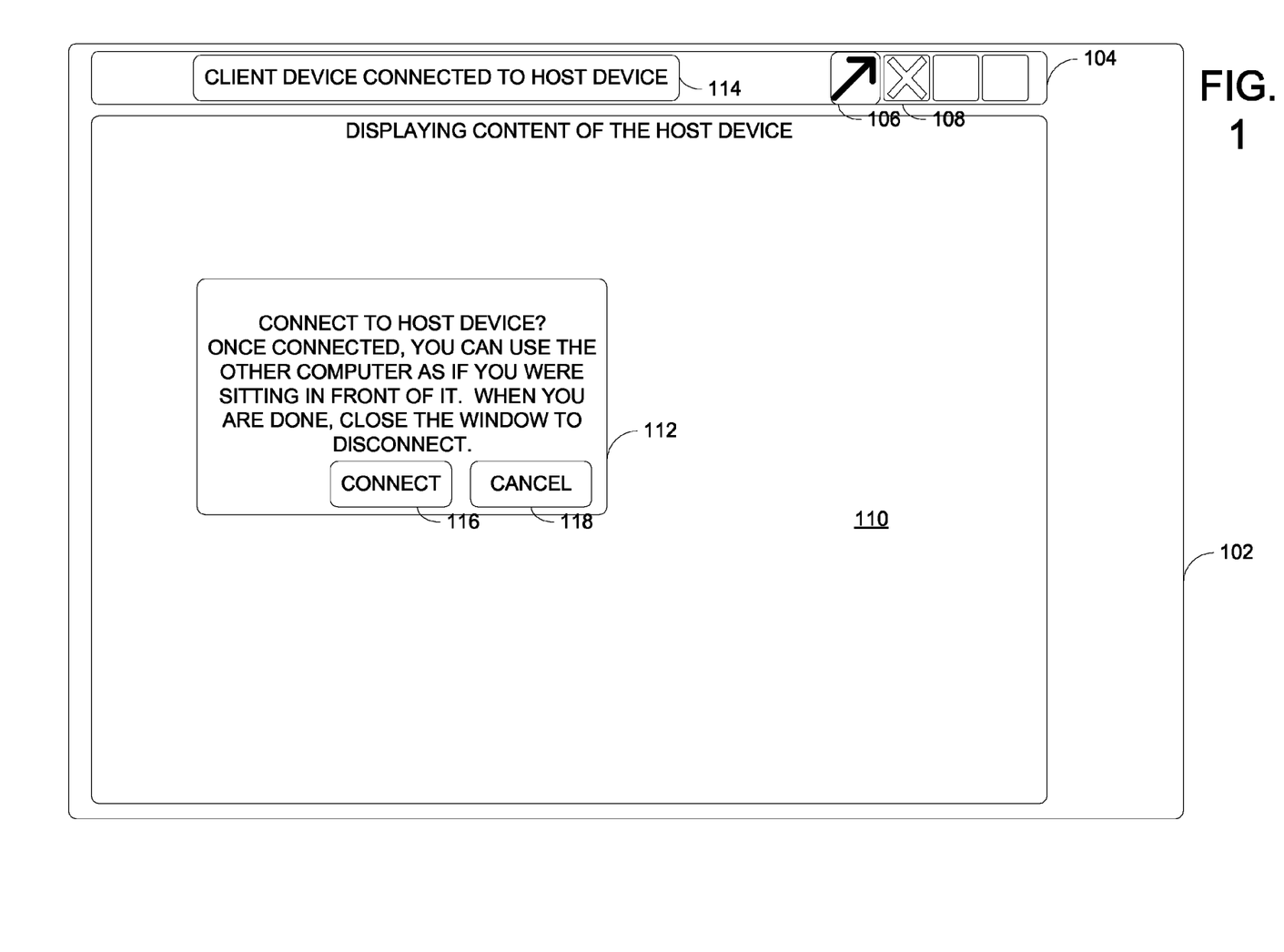
FIGS. 1 to 4 are diagrams illustrating exemplary embodiments of a user interface display shown on a client device and a host device during the connection between the two devices according to an embodiment of the invention.

FIG. 1 illustrates a graphical UI (GUI) display 102 to be displayed on the client device. For example, the client device may be a computing device, such as the computer 130 in FIG. 8. In another example, the client device may be a portable device, such as a PDA, a portable media player, a portable gaming console, a cellular phone, or the like. In one embodiment, the client device is connected to a host device via a web portal without a remote management software or program installed on the client device or the host device. In one example, the host device may be a computer, also similar to the computer 130 in FIG. 8. In one operational situation, the client device may be a home computer for a user while the host computer may be a computer at the user's office.

In this situation, the client device and the host device may be connected based on the following exemplary and simplified method. For example, a device ID is assigned to the host device. Based on the assigned device ID, a connection is established between a server and the host device over a communication network, such as an intranet, an internet, or the Internet. A user at the location of the client device sends a first instruction for accessing to a web portal or an online interface. The user is authenticated by the server in response to the received first instruction. An online status is established for the authenticated user. In one embodiment, the host device is one of the devices that are available to the user at the web portal to establish a connection.

Referring again to FIG. 1, the GUI display 102 includes a status display area or a status bar 104. For example, the status display area 104 indicates information relating to a connection status between the host device and the client device, such as a connection status message 114. In another embodiment, the connection status includes at least one of the following types of information: connecting, connected, and arbitrating (i.e., connection arbitration). In an alternative embodiment, the status display area 104 also includes parameters that correspond to where the status display area is displayed (i.e., on the client device or on the host device). In a further alternative embodiment, the client status display area 104 may be modified to have alternative appearances as a function of a varying degree of visibility. However, the client status display area may have a translucent or transparent visibility layering over windows or text. In another embodiment, the visibility modification of the client status display area 104 may be triggered or coupled with other events, such as in a maximized screen size mode.

The status display area 104 also includes sub-fields, such as sub-fields 106 and 108. The sub-field 106 includes controls or activators for controlling or modifying the display area of a content window 110. For example, the sub-field 106 may include a toggle or a control for maximizing the content window 110. In another example, once the user has activate the maximized window control included in the sub-field 106, the sub-field 106 may dynamically display a different control or toggle for restoring the display size of the content window 110 to the original or pre-defined size. The sub-field 108 includes controls or operations for terminating the connection between the client device and the host device.

Still referring to FIG. 1, the content window 110 is configured to display content or information retrieved from the host device. As the server assists in establishing a connection between the host device and the client device, the content window 110 receives information from the server after the server retrieves information from the host device. In another embodiment, the content window 110 establishes a substantially instantaneous access to the host device and the interactions between the user and the client device are mirrored at the host device. For example, the mouse cursor movements and locations, the keyboard key strokes, or the like may be captured and transmitted to the host device as if the user was physically present at the host device.

The GUI display may also include a notification window 112 which displays one or more notification or alert messages to the user. In one example, the notification window 112 may also include interactive controls. In the illustrated example in FIG. 1, the notification window 112 includes a control or button "CONNECT" 116 for connecting the client device to the host device. Similarly, the notification window 112 also includes a control or button "CANCEL" 118 for canceling a request to connect to the host device.

Figure 2:
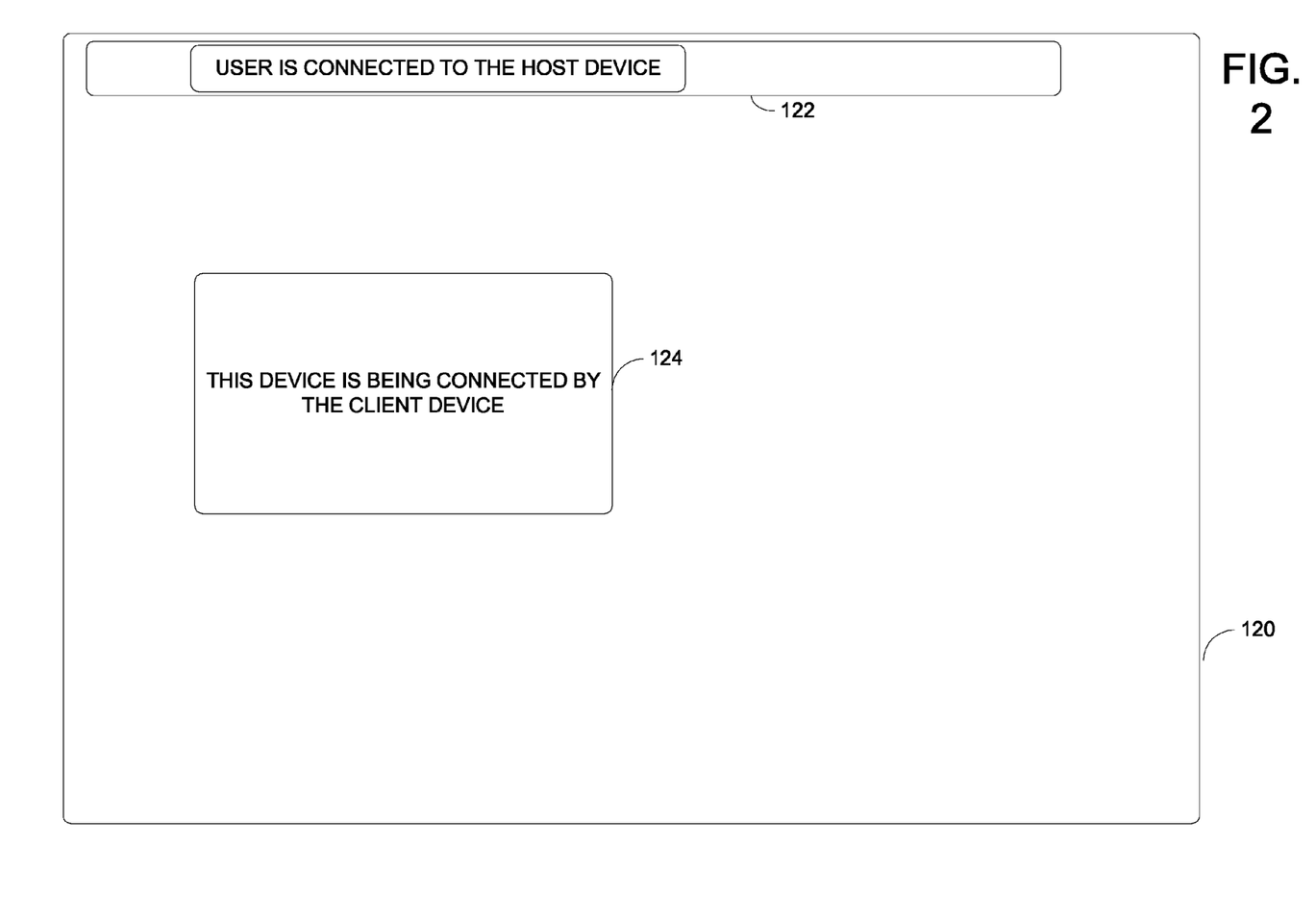

Referring now to FIG. 2, a separate GUI display 120 is shown on a display of the host device after the client device has connected to the host device. For example, the host device may be displaying information accessible by the host device. In this example, the host device may initially display files, folders, applications or the like from its storage area or memory storage unit. As described earlier, the host device is made available for access through a web portal associated with the user (who is physically at a location of the client device). As such, once the client device has gained access or is connected with the host device, the GUI display 120 will be displayed and making the content or information previously displayed invisible until further control from someone at the location of the host device. In one embodiment, the GUI display 120 also includes a host status display area or host status bar 122 for indicating a connection status of the host device. In another embodiment, the connection status includes at least one of the following types of information: connecting, connected, and arbitrating (i.e., connection arbitration). In an alternative embodiment, the status display area 122 also includes parameters that correspond to where the status display area is displayed (i.e., on the client device or on the host device). In this illustrated embodiment, the host status display area 122 fails to include sub-fields 106 and 108 as compared to the client status display area 104. Also, the parameters associated with the host status display area 122 enable the server to properly identify a destination for sending varying messages or notifications. In other words, based on the parameters of the host status display area 122 or the client status display area 104, the server may generate corresponding messages to be displayed at the host device or the client device.

In one embodiment, the GUI display 120 may darken the entire display area of the GUI display 120, except the host status display area 122, when the host device is connected to the client device. Such feature is beneficial to ensure that someone at the location of the host device is unable to view the interactions by the user as the user interacts with the host device from the client device. In one embodiment, the GUI 120 may be darkened after a pre-defined time period has elapsed, such as 15 minutes. In an alternative embodiment, a notification window 124 may be displayed in addition to the darken display area or in place of the darken display area. By example, the darkening of the display area may include displaying the GUI display 120 with a black color or modifying colors of the GUI display 120 to avoid the interactions being visible.

In an alternative embodiment, a user may be connected to the host device under different access context or privilege context. For example, the user may access the host device under an administrator mode or a non-administrator mode. In these different scenarios, the GUI display 122 and/or the GUI display 102 may corresponding modify its display features or behaviors. For example, under the non-administrator mode, the GUI display 122 may disable the darkening of the GUI display 122. In another embodiment, the GUI display 104 may disable additional features or sub-fields of the client status display area 104 if the user is operating under the non-administrator mode.

Figure 3:
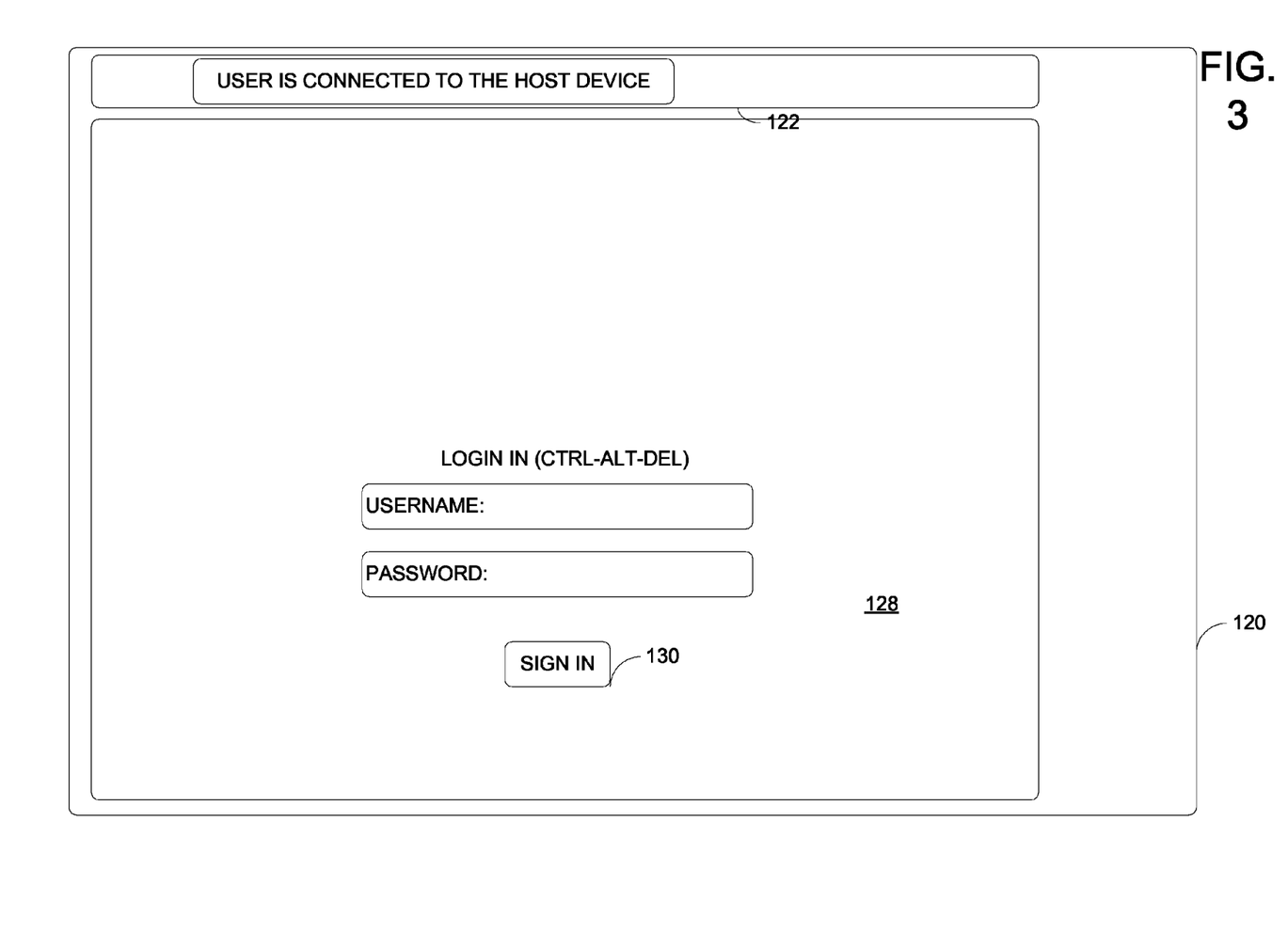

Referring now to FIG. 3, the GUI display 120 may further display a log-in window 128 for enabling someone to log-in to the host device. For example, suppose an individual or a co-worker of the user wishes to access the user's host device. For example, the individual may wish to assist the user for further troubleshooting the host device or the like. The individual may wish to log-in to the host device and may trigger a display of the log-in window by pressing activating keystrokes, such as "CTRL-ALT-DEL" or "CTRL-EJECT". Other activating keystrokes may be used without departing from the scope or spirit of the invention. Once the activating keystrokes are received, the log-in window 128 appears and enables the individual to log-in to the host device by successfully verifying the individual's credentials (e.g., username and password pair). The log-in window 128 includes at least a log-in button or control 130 for logging the individual.

Figure 4:
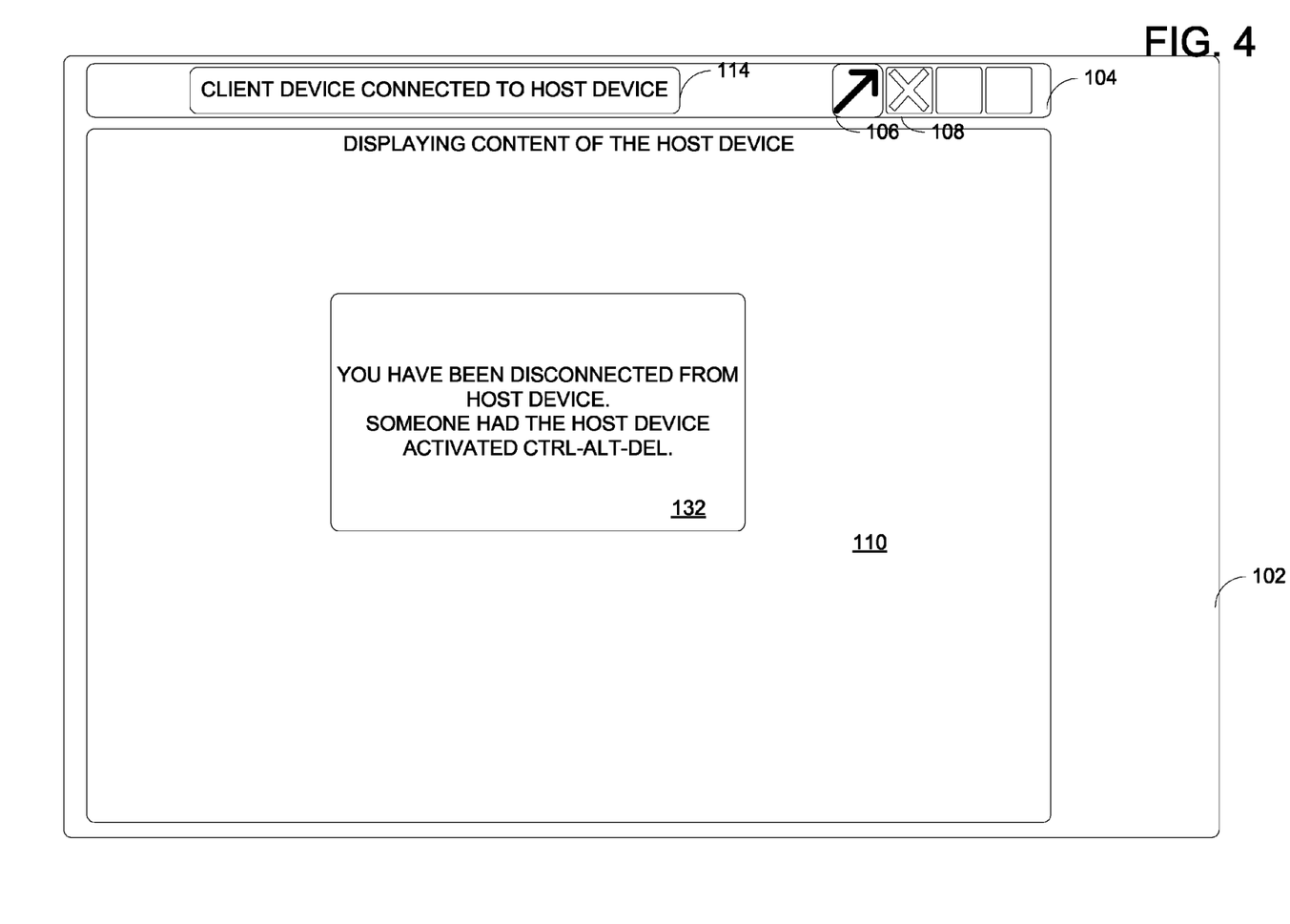

Once someone or the individual has signed in at the host device, a corresponding window 132 is displayed on the client device in FIG. 4 for notifying the client device that the connection has been terminated due to logging in (or other interruption) by someone at the location of the host device. In one embodiment, the client device will not lose connection or be disconnected as a result of someone logging in at the host device.

Figure 5:
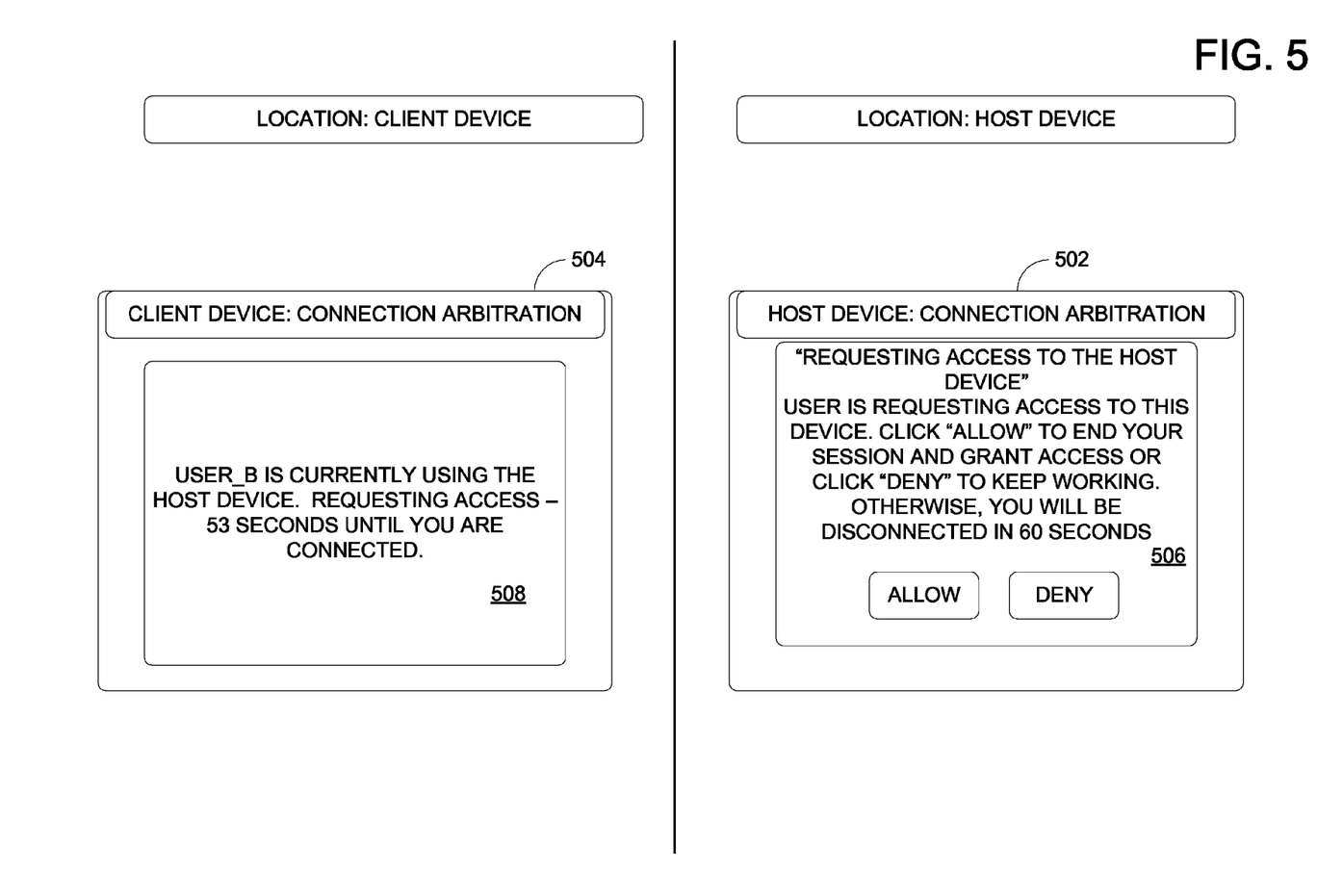
FIG. 5 is a diagram illustrating an exemplary embodiment of a user interface display shown on a host device and a client device during connection arbitration according to an embodiment of the invention.

Referring now to FIG. 5, a comparative illustration shows a connection arbitration in operation as a client device is attempting to connect to the host device. In FIG. 5, as a user at a location of the client device is attempting to connect to the host device at a location remote from the client device, the server displays a separate status bar to each device; a host status bar 502 (e.g., similar to host status display area 122) on the host device, and a client status bar 504 (e.g., similar to client status display area 104). The status bar is now displaying the connection status which is in a connection arbitration mode. This connection arbitration mode is a process when the host device and the client device are negotiating the connection between the two devices. In this illustrated example, the server displays a window 506 requesting a permission from a user at the location of the host device to grant access of the host device to the client device. Similarly, a corresponding window 508 is displayed at the client device indicating the connection status that the client device will be connected to the host device if the user at the host device grants the permission or a pre-defined time has elapsed. It is to be understood that other messages and responses may be configured to the windows 506 and 508 without departing from the scope or spirit of embodiments of the invention. For example, in the administrator mode, the client device may gain access to the host device without the window 506 appearing on the display of the host device and once the connection is established, the host device is "locked," which may include deactivation or disabling of input and output devices of the host device.

Figure 6:
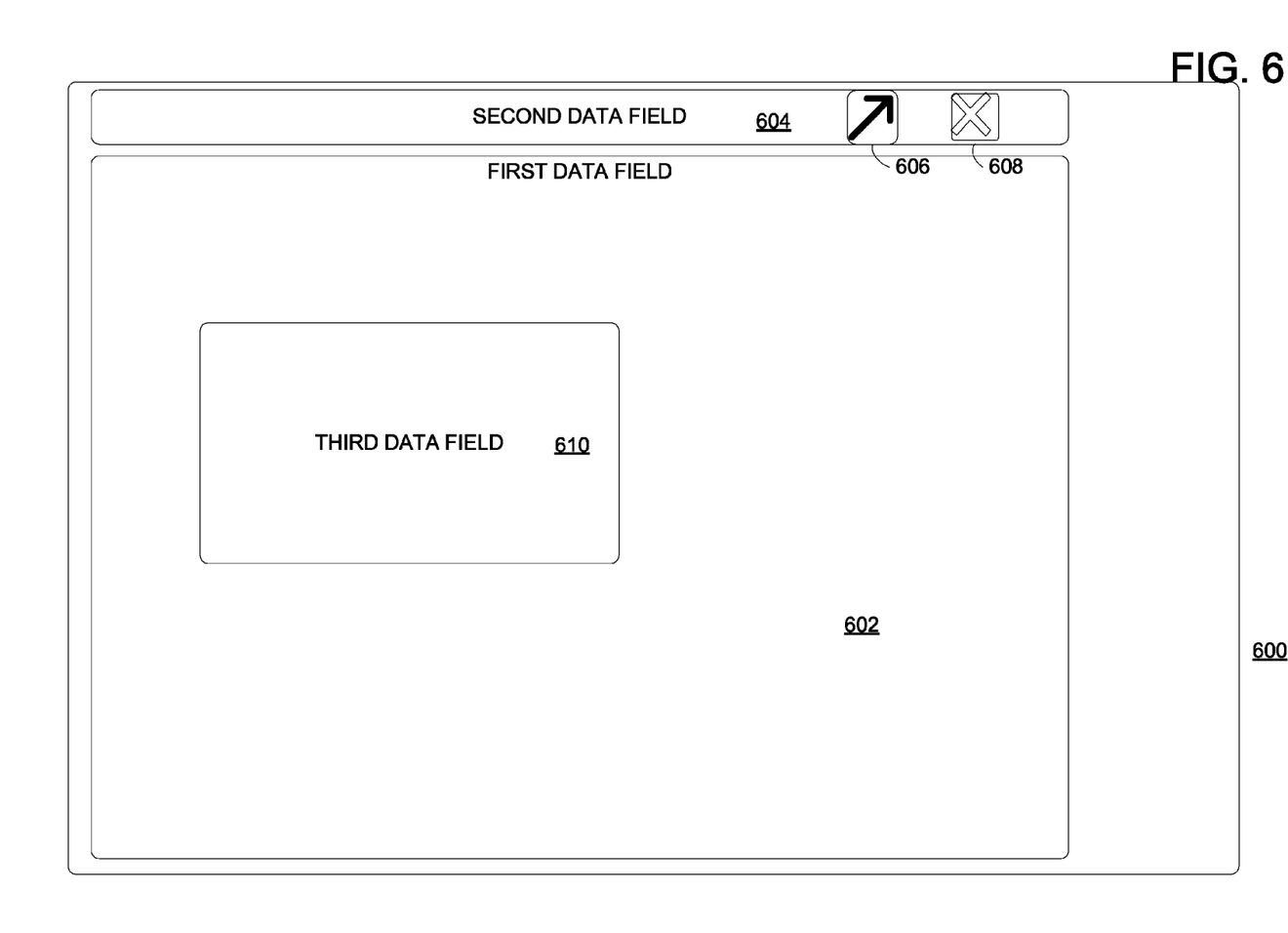
FIG. 6 is a block diagram illustrating an exemplary computer-readable medium on which aspects of the invention may be stored.

Referring now to FIG. 6, a block diagram illustrating an exemplary computer-readable medium 600 on which aspects of the invention may be stored. In one embodiment, the computer-readable medium 600 may be a computer storage medium having tangible data structured stored thereon (see also descriptions below). In one example, the data structure includes a first data field 602 for storing data for a first display window. The first display window is displayed on a client device and displaying content from a host device, such as the host device. A second data field 604 stores data for a status display area. The status display area indicates information associated with a connection status between the host device and the client device as displayed in a client application, such as a client browser, in response to the displayed content in the first data field 602. For example, the second data field 604 may include connection status showing at leas the following information: connecting, connected, and arbitrating. The data structure further includes a third data field 610 for storing data for a notification display window. The notification display window displays notification information associated with at least one of the following: the displayed content from the host device, and the connection status indicated by the second data field. In one embodiment, the second data field 604 includes a first sub-data field 606 in the second data field 604 for storing data for a screen mode activator. The screen mode activator activates at least one of the following operations: expanding a size of the first window in the first data field to fit a display size of a display device and restoring the size of the first window to an initial pre-defined size. Also, the second data field 604 may further includes a second sub-data field 608 in the second data field 604 for storing data for a termination control. The termination control terminates a connection with the host device.

In the embodiments where the computer-readable medium 600 is employed on a host device, the first data field 602 stores data for a first display window on the host device. The second data field 604 stores data for a status display area, and the status display area indicates information associated with a connection status between the host device and the host device. However, the implementation of the second data field on the host device will not include the sub-fields, such as the sub-fields 606 and 608. The third data field 610 stores data for a notification display window and the notification display window displays notification information associated with at least the connection status indicated by the second data field 604.

Figure 7:
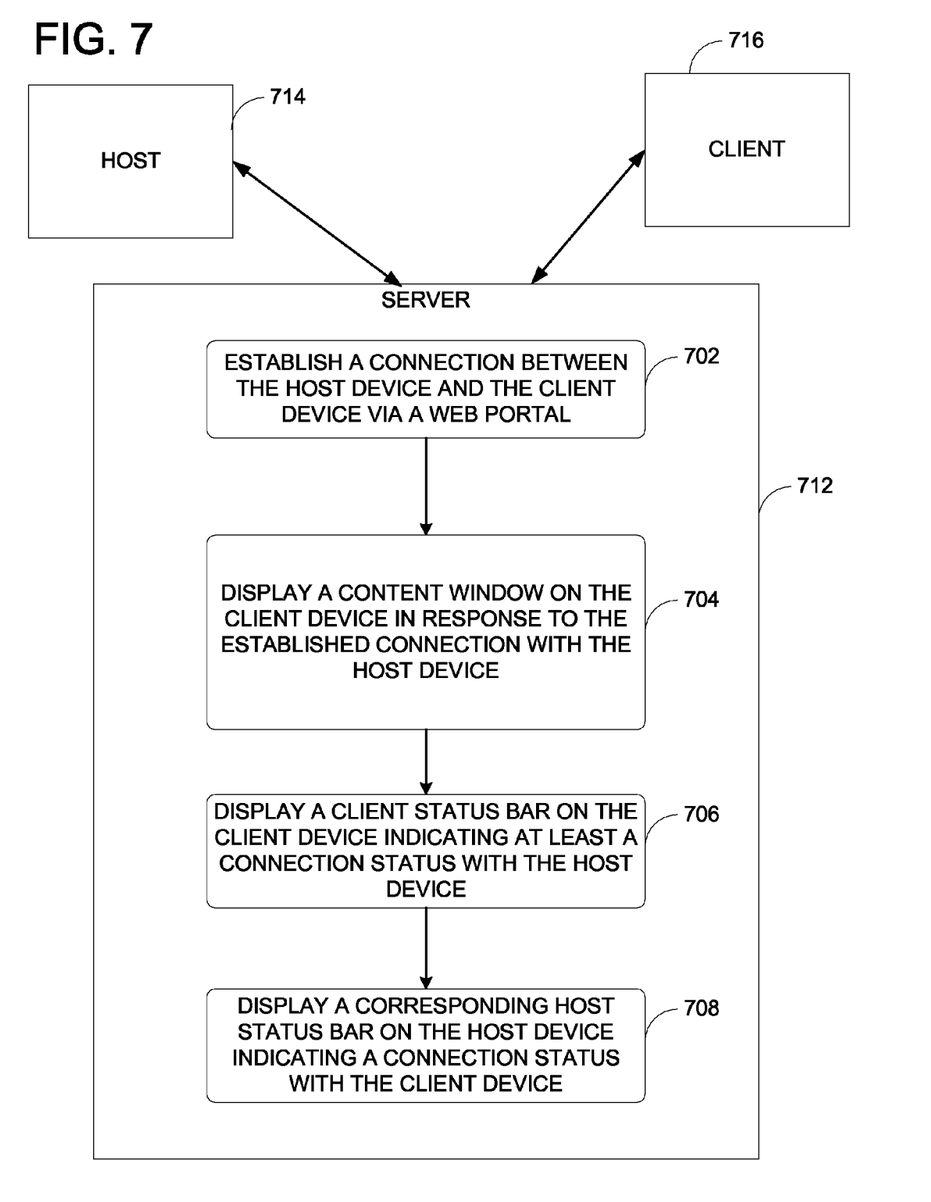
FIG. 7 is an exemplary flow chart illustrating operations of enabling a user interface for management of a host device from a client device.

Referring now to FIG. 7, an exemplary flow chart illustrating operations of enabling a user interface for management of a host device from a client device. At 702, a connection is established between a host device and a client device via a web portal. The host device and the client device do not have a remote management software installed thereon. A content window is displayed on the client device in response to the established connection with the host device at 704. The displayed content window displays content retrieved from the host device. At 706, a client status display area is displayed on the client device indicating at least a connection status with the host device. At 708, a corresponding host status display area is displayed on the host device indicating a connection status with the client device. The displayed client status display area specifically identifies the client device and defines client parameters for receiving messages during management of the host device and the displayed host status display area specifically identifies the host device and defines host parameters for receiving messages during interaction with the client device.

In an alternative embodiment, embodiments of the invention selectively transmit a notification message to the client device based on the client status display area and the client parameters and selectively transmit a notification message to the host device based on the host status display area and the host parameters. A further aspect of the invention detects a user presence at the host device and further transmits a client notification to the client device in response to the detected user presence at the host device. In another embodiment, in response to the transmitted client notification, embodiments of the invention transmit a host notification to the host device notifying a user at the host device that another user at the client device is attempting to connect to the host device. In one implementation, the client status display area has a greater display area than the host status display area. Also, the server embodying aspects of the invention may detect interaction activities on the client device and the host device and may darken a display area of a display of the host device when failing to detect interaction activities from the host device for a pre-defined period of time.

From the perspective of a server 712 relative to a client device 716, embodiments of the invention in one form is a computer storage medium having a data structure stored thereon for a user interface to manage a host device by a client device. The data structure includes a first data field storing data for a first display window being displayed via a client application on the client device and displaying content from the host device. The data structure also includes a second data field storing data for a status display area indicating information associated with a connection status between the host device and the client application in response to the displayed content in the first data field. A third data field stores data for a notification display window displaying notification information associated with at least one of the following: the displayed content from the host device, and the connection status indicated by the second data field.

In another embodiment, from the perspective of the server 712 relative to the client device 716 and a host device 714, the invention in one form is method of enabling a user interface for management of a host device from a client device. Methods of this embodiment include:

establishing a connection between the host device and the client device via a web portal, with host device and the client device being without a host management software installed thereon;

displaying a content window on the client device in response to the established connection with the host device with the displayed content window displaying content retrieved from the host device;

displaying a client status display area on the client device indicating at least a connection status with the host device; and displaying a corresponding host status display area on the host device indicating a connection status with the client device;

wherein the displayed client status display area identifies the client device and defines client parameters for receiving messages during management of the host device by the client device, and wherein the displayed host status display area identifies the host device and defines host parameters for receiving messages during interaction with the client device.

Also, from the perspective of the server 712 relative to the host device 714, aspects of the invention in one form is a computer storage medium having a data structure stored thereon for displaying a user interface on a host device during a management by a host device. The data structure includes a first data field storing data for a first display window being displayed on the host device. A second data field stores data for a status display area indicating information associated with a connection status between the host device and the host device. And, the data structure includes a third data field storing data for a notification display window displaying notification information associated with at least the connection status indicated by the second data field.

Figure 8:
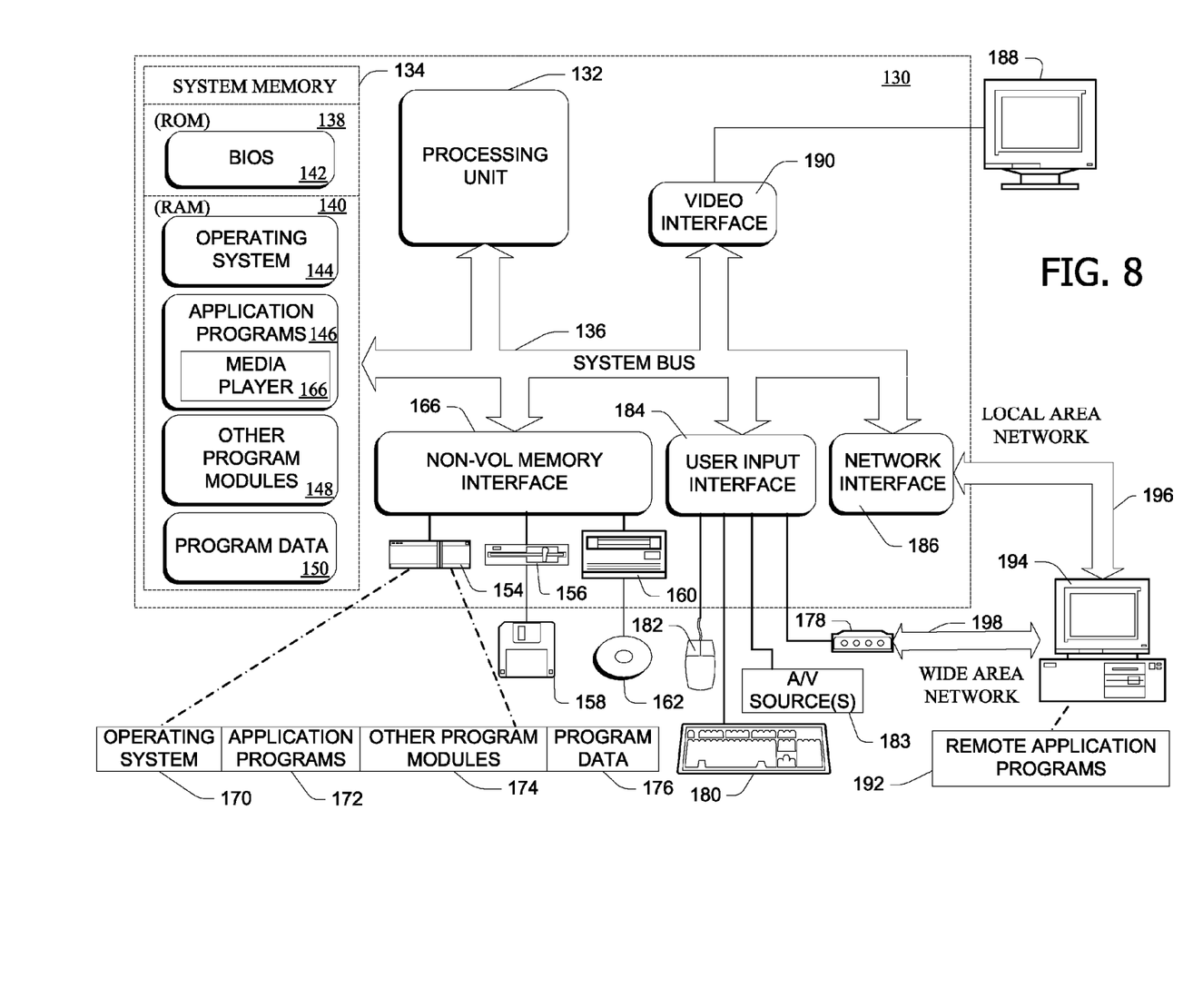
FIG. 8 is a block diagram illustrating one example of a suitable computing system environment in which the invention may be implemented.

FIG. 8 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. Byway of example, and not limitation, FIG. 8 illustrates operating system 144, application programs 146, other program modules 148, and program data 150.

The computer 130 may also include other removable/non-removable, volatile/nonvolatile computer storage media. For example, FIG. 8 illustrates a hard disk drive 154 that reads from or writes to non-removable, nonvolatile magnetic media. FIG. 8 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 8, provide storage of computer readable instructions, data structures, program modules and other data for the computer 130. In FIG. 8, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 8 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 8 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. Aspects of the invention described herein includes these and other various types of computer-readable storage media when such media contain instructions or programs for implementing the steps described below in conjunction with a microprocessor or other data processor. Further, aspects of the invention include the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

In operation, computer 130 executes computer-executable instructions such as those illustrated in the figures to implement aspects of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A client device comprising a computer storage medium, wherein the medium is not a signal, said computer storage medium storing a data structure stored thereon for a user interface to manage a host device by said client device, said data structure comprising:
   a first data field storing data for a first display window being displayed via a client application on the client device and displaying content from the host device;
   a second data field storing data for a status display area indicating information associated with a connection status of a connection between the host device and the client device in response to the displayed content in the first data field, wherein the connection status comprises one or more of the following: connecting, connected, and arbitrating; and
   a third data field storing data for a notification display window displaying notification information associated with at least one of the following: the displayed content from the host device, and the connection status indicated by the second data field,
   wherein when the client device is connected to the host device in a non-administrator mode, one or more sub-fields of the status display area are disabled, and when the second data field indicates that the connection status is arbitrating, the host device notifies a host device user that the client device is attempting to connect to the host device, said notification allowing the host user the option to allow or deny the connection;
   wherein when the client device is connected to the host device in an administrator mode, all sub-fields of the status display area are enabled, said sub-fields comprising data for adjusting a display visibility of the status display area, the data for adjusting enabling a translucent visibility of the status display area, and the connection is formed without a notification to a host device user and the host device is locked, causing the input and output devices of the host device to be disabled;
   wherein the connection between the client device and host device is formed via a server, the server maintaining a plurality of devices to which the client device can connect, the host device being one of the plurality of devices;
   wherein when the client device requests access to the host device, the server authenticates a client device user and grants the client device access to the host device; and
   wherein when the client device is connected to the host device, information from the host device to the client device for display on the client device is transferred via the server.

2. The computer storage medium of claim 1, wherein the first display windows further displays information relating to a connection progress before displaying content from the host device.

3. The computer storage medium of claim 1, further comprising a first sub-data field in the second data field storing data for a screen mode activator activating at least one of the following operations: expanding a size of the first window in the first data field to fit a display size of a display device and restoring the size of the first window to an initial pre-defined size.

4. The computer storage medium of claim 1, further comprising a second sub-data field in the second data field storing data for a termination control terminating a connection with the host device.

5. A method of enabling a user interface for management of a host device from a client device, said method comprising:
   establishing a connection between the host device and the client device via a web portal between an internet browser application on the host device and an Internet browser application on the client device, said internet browser applications being capable of connecting to and browsing the Internet;
   displaying a content window on the client device in response to the established connection with the host device, said displayed content window displaying content retrieved from the host device;
   enabling darkening of a display area of a display of the host device when the client device connects to the host device in an administrator mode;
   disabling darkening of the display area of the display of the host device when the client device connects to the host device in a non-administrator mode;
   enabling all sub-fields of a client status display, said sub-fields comprising data for adjusting a display visibility of the status display area, the data for adjusting enabling a translucent visibility of the status display area and displaying the client status display area with translucent visibility on the client device indicating at least a connection status with the host device when the client device connects to the host device in an administrator mode;

disabling one or more sub-fields of the client status display area when the client device connects to the host device in a non-administrator mode;

displaying a corresponding host status display area on the host device indicating a connection status with the client device;

receiving notification of a user logging into a location of the host device;

notifying the client device of said notification; and disconnecting the client device from the host device responsive to said received notification;

wherein the displayed client status display area identifies the client device and defines client parameters for receiving messages during management of the host device by the client device, and wherein the displayed host status display area identifies the host device and defines host parameters for receiving messages during interaction with the client device;

wherein the connection between the client device and host device is formed via a server, the server maintaining a plurality of devices to which the client device can connect, the host device being one of the plurality of devices;

wherein when the client device requests access to the host device, the server authenticates a client device user and grants the client device access to the host device; and wherein when the client device is connected to the host device, information from the host device to the client device for display on the client device is transferred via the server.

6. The method of claim 5, further comprising at least one of the following: selectively transmitting a notification message to the client device based on the client status display area and the client parameters, and selectively transmitting a notification message to the host device based on the host status display area and the host parameters.

7. The method of claim 5, wherein the client status display area comprises a greater display area than the host status display area.

8. The method of claim 5, further comprising detecting interaction activities on the client device and the host device.

9. A host device comprising a computer storage medium, wherein the medium is not a signal, said computer storage medium storing a data structure stored thereon for displaying a user interface on said host device during management by a client device via a server, said data structure comprising:

a first data field storing data for a first display window being displayed on the host device;

a second data field storing data for a status display area indicating information associated with a connection status of a connection between the host device and the client device, wherein when the client device is connected to the host device in a non-administrator mode, one or more sub-fields of the status display area are disabled, wherein when the client device is connected to the host device in an administrator mode, all sub-fields of the status display area are enabled, said sub-fields comprising data for adjusting a display visibility of the status display area, the data for adjusting enabling a translucent visibility of the status display area wherein the connection status comprises one or more of the following: connecting, connected, and arbitrating; and a third data field storing data for a notification display window displaying notification information associated with at least the connection status indicated by the second data field, wherein when the connection status is set to arbitrating, the client device prompts a user of the host device for access, and the client device is granted access to the host device after a pre-defined time of non-responsiveness from a current user of the host device; and wherein when the client device is granted access to the host device after the pre-defined time of non-responsiveness from the current user of the host device, said current user is disconnected from the host device to prevent any interaction of said current user with the host device;

wherein when the connection status is set to arbitrating, the client device prompts a user of the host device for access, and the client device is granted access to the host device after a current user of the host device allows access by the client device;

wherein when the client device is granted access to the host device after the current user of the host device allows access by the client device, said current user is disconnected from the host device, causing the input and output devices of the host device to be disabled to prevent any interaction of said current user with the host device;

wherein the connection between the client device and host device is formed via a server, the server maintaining a plurality of devices to which the client device can connect, the host device being one of the plurality of devices;

wherein when the client device requests access to the host device, the server authenticates a client device user and grants the client device access to the host device; and wherein when the client device is connected to the host device, information from the host device to the client device for display on the client device is transferred via the server.

10. The computer storage medium of claim 9, wherein the notification display window displaying information identifying an attempt by the client device to connect with the host device.

11. The computer storage medium of claim 9, wherein the second data field comprises data for updating the status display area as a function of the connection status.

12. The computer storage medium of claim 9, wherein the first data field comprises data for darkening the first data field in response to the server failing to detect interactions from the host device for a pre-defined period of time.

* * * * *